US010992764B1

(12) United States Patent
Esmaeili et al.

(10) Patent No.: US 10,992,764 B1
(45) Date of Patent: Apr. 27, 2021

(54) AUTOMATIC USER PROFILING USING VIDEO STREAMING HISTORY

(71) Applicant: Amazon Technologies, Inc., Seattle, WA (US)

(72) Inventors: Maryam Esmaeili, Tukwila, WA (US); Shaun McCarthy, Seattle, WA (US); Pranay Doshi, Seattle, WA (US); Alexandra Swain, Seattle, WA (US); Cody Severinski, Seattle, WA (US); Dheeraj Krishna Veerla, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 16/216,407

(22) Filed: Dec. 11, 2018

(51) Int. Cl.
*H04L 29/08* (2006.01)

(52) U.S. Cl.
CPC ............ *H04L 67/22* (2013.01); *H04L 67/306* (2013.01)

(58) Field of Classification Search
CPC .............................. H04L 67/22; H04L 67/306
See application file for complete search history.

(56) References Cited

U.S. PATENT DOCUMENTS

| | | | | |
|---|---|---|---|---|
| 2005/0149977 | A1* | 7/2005 | Nakamura | H04N 21/4312 725/105 |
| 2005/0193015 | A1* | 9/2005 | Logston | G06F 16/44 |
| 2010/0030578 | A1* | 2/2010 | Siddique | G06Q 30/06 705/3 |
| 2017/0243244 | A1* | 8/2017 | Trabelsi | G06Q 30/0255 |
| 2018/0189392 | A1* | 7/2018 | Sayman | G06F 16/71 |

OTHER PUBLICATIONS

Guo, Xifeng et al., Deep Embedded Clustering with Data Augmentation; Proceedings of Machine Learning Research; College of Computer, National University of Defense Technology; Academy of Computer Machine Learning (2018); pp. 550-565.

* cited by examiner

*Primary Examiner* — Azizul Choudhury
(74) *Attorney, Agent, or Firm* — Lee & Hayes, P.C.

(57) ABSTRACT

A computer-implemented method includes grouping video title items into clusters based on video title characteristics. A system processor identifies a connecting characteristic of the video title characteristics that associates a first cluster of video title items and a second cluster of video title items. The system creates a user profile associated with a video content account based at least in part on a history of streamed/downloaded video title items by identifying a video title characteristic associated with two or more video content items streamed/downloaded by the video content account, and grouping the two or more video content items based at least in part on the first cluster of video title items and the second cluster of video title items. The system provides a system-generated user profile that identifies user specific video content from an account having multiple users streaming content in association with the account.

20 Claims, 9 Drawing Sheets

AUTOMATIC USER PROFILING USING VIDEO STREAMING HISTORY

BACKGROUND

An online video content provider may supply online videos such as movies, television shows, user-created content, etc., to multiple users of a single account. For example, a single household may include adults, children, and teens, who each have individual preferences for content of interest. When multiple users stream the various titles using a single account, heuristics for recommending titles based on viewer history may not be effective. For example, if a family of five individuals all access streamed content via the Internet using a single account, where that account does not include multiple profiles, conventional algorithms that predict user interests based on records of titles that were streamed may not be effective because there is not a single individual identified in the account. Instead, the recommendations may be based on the combined interests of all five individuals in the family, as opposed to the recommendations being specific to each individual family member. As a result, the recommendations may apply to some, but not all, of the individuals.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Various computer-implemented processes and features are disclosed for using a neural network or other computing architecture to discover associations between video content that is streamed by an account user of a content delivery service. More particularly, when multiple users access the streamed video content using a single account, the disclosed systems and processes may generate customized recommendations based on discovered user preferences for a particular user.

Today, video content is often provided to users through online accounts that are accessible by user devices (e.g., through an application operating on the user device), accessible via desktop computer, laptop computer, tablet device, or through other Internet-connected devices (e.g., electronic book (eBook) reader devices, gaming consoles, mobile devices, etc.).

Often, a single family (or a different group of users, such as employees of an employer, a group of classmates, non-immediate family members, etc.) may use the same video content account to stream video titles (also referred to herein as video content items). For example, a child in a family may stream animated content, the parents may stream mystery titles and comedy titles, a teenager in the home may stream situational comedy from the mid 1990's, and a grandparent in the home may enjoy streaming live rock music concerts and music videos from the 1970's. Although the family members access the content through a single account, from the perspective of a conventional video content provider, absent creation of individual sign-ins and/or user profiles, the account may be effectively associated with a single user. Stated another way, conventional systems may not distinguish video content preferences with particular users of the video content account.

According to embodiments described herein, the systems and processes may evaluate streaming history of a video content account. As used herein, a video content account is a video streaming services account acting as a gateway to video content delivered online by a video content provider. The video content account may provide video content access to multiple users, who may or may not be individually associated with the video streaming services account. For example, the users may be various members of the same family living within the same household, where multiple members of the family use the video streaming services account as a gateway to download (or stream) various video content files. Because the different users are using the same account without individual user profiles, some embodiments may generate one or more user profiles that associate video title characteristics of streamed video titles with individual users. Once the generated user profiles are presented to a user, in some aspects, the user may edit the predetermined user preferences for accuracy using a user profile management interface (embodied, for example, as a web page or an application operating on a user device).

In one aspect, a computer-implemented method includes training the system using global data associated with video title items that have been downloaded or streamed by individuals using numerous video content accounts. For example, the system may train data clusters based on accessing hundreds or thousands of downloads in a geographic region over a predetermined timespan. As explained in greater detail hereafter, the data clusters may be groups of video title items that share one or more similar video title characteristics. Training the data clusters may include grouping video title items into clusters based on the video title characteristics.

The video title characteristics, as explained in greater detail hereafter, may be indicative of qualities or characteristics of the video content. For example, a video title characteristic may be indicative of the type of content such as, for example, humorous television programming. The video title characteristics may include information that normally categorizes video content (e.g., genre). However, video title characteristics may also be characteristics of the video content that could not be appreciated by a human observer looking at a dataset associated with multiple downloads of the video content. For example, video title characteristics may be combinations of elements that streamed video title items share in common such as, for example, a particular music played in multiple titles that are otherwise unassociated with one another, titles played on a certain time of the day, week, or year, titles played by a person that also streams another unrelated type of video content, etc.

According to an embodiment, the system may group video title items into clusters of video title items based on one or more video title characteristics. The system may also identify a connecting characteristic of the one or more video title characteristics. According to some embodiments, connecting characteristics may be one or more characteristics associated with two different clusters. For example, video content items may be clustered based on a characteristic of music played somewhere within the video content. And yet another cluster of video contents may be grouped together (or clustered) based on a completely unrelated video title characteristic, such as video content with a particular actor appearing in all of the videos. While the particular actor is in no way associated with the music shared in all of the videos of the first cluster, according to some embodiments the system may apply a neural network and machine learning algorithms to evaluate large sets of video content streaming data to determine video title characteristics that form clusters the video title items, and identify one or more shared associations that would have otherwise been hidden from a human observer of the data. The shared association may indicate that videos having the particular music may also appeal to a viewer that is a fan of a particular actor. Although an actor's identity may not have any connection with music used in films, there may be an unconscious affinity by the viewer for other titles sharing one or more of the common characteristic. It may be advantageous to determine other recommendations based on newly-identified associations.

In other aspects, after training the system with a large data set of video title streaming information, the system may apply the learned information (for example the clusters of video title items and various associations between the clusters of video title items) to a history of streamed video title items associated with the single account. For example, in one aspect, the system may create a first cluster and a second cluster based on a first cluster of video items in the second cluster of video items learned from the global data set. The system may create a first user profile associated with the video content accounts based at least in part on the history of screen video title items. Creating the first user profile can including identifying a first video title characteristic associated with two or more video content items streamed by the video content account and grouping the two or more video content items streamed by the video content accounts based, at least in part, on the first cluster of video title items and the second cluster of video title items. The system may associate the first video title characteristic to the first user profile based at least in part on an affinity score. The affinity score may be indicative of a first user video content preference. That is, a first user may prefer specific types of video content. An affinity score may be a quantitative valuation method for identifying a quantitative value of the user's preference for specific content. Accordingly, the system may provide the first user profile information to present the first user profile to the profile management interface.

Figure 1:
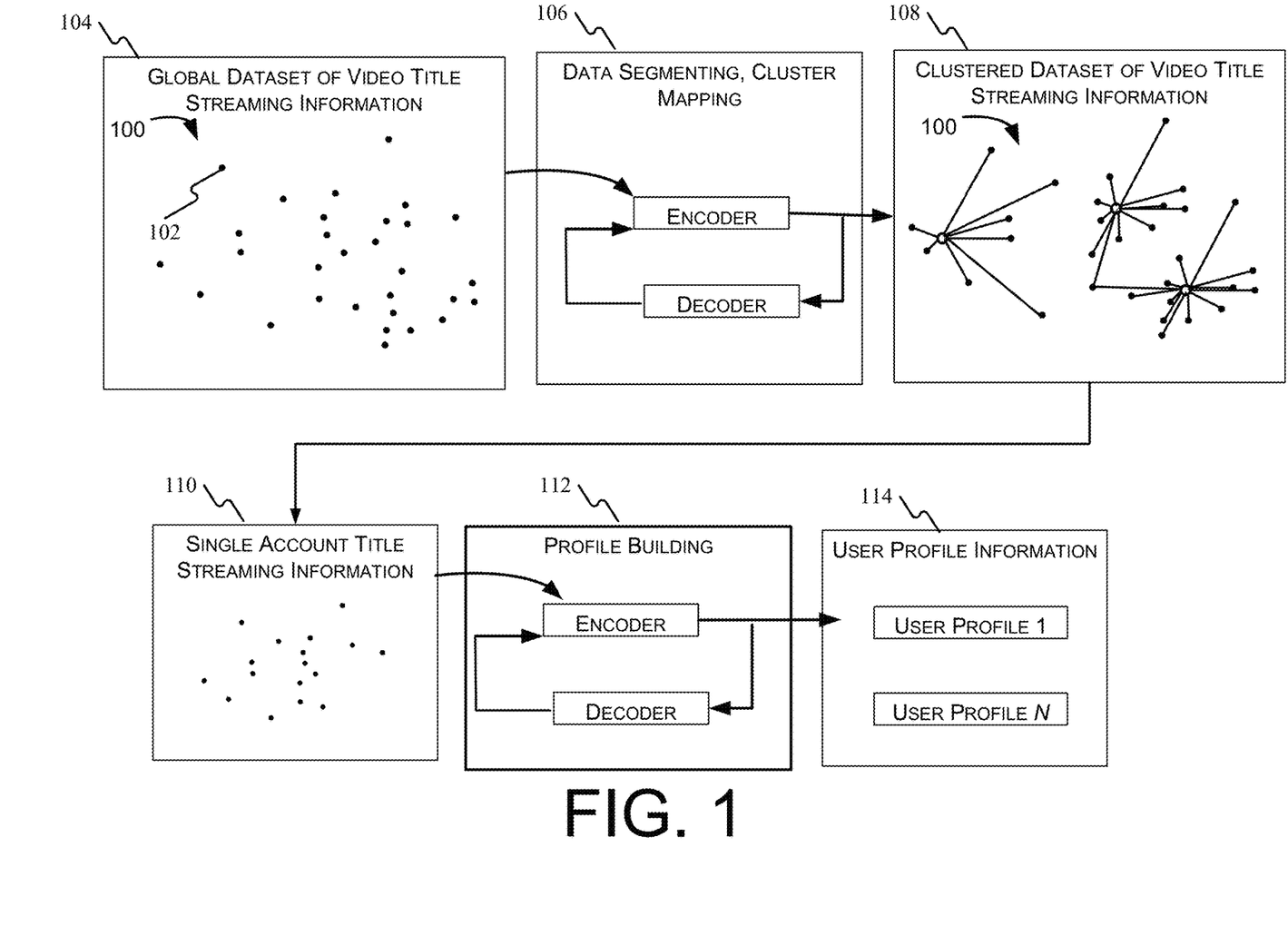
FIG. 1 is a block diagram of a generating individual user profiles from a dataset of content stream history, according to example embodiments of the disclosure.
Figure 2:
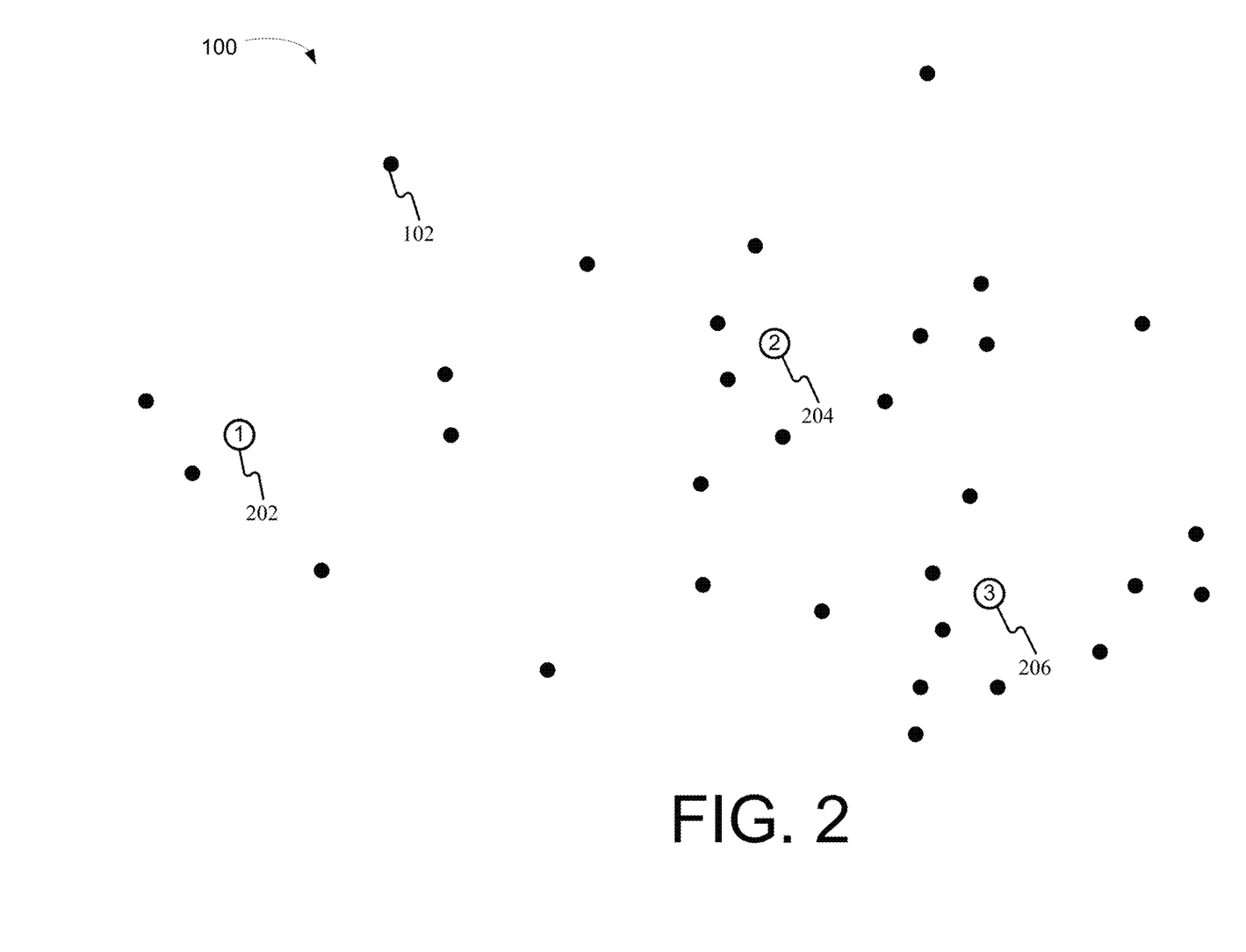
FIG. 2 is a depiction of three centroids in the ungrouped video title items of FIG. 1, according to example embodiments of the disclosure.
Figure 4:
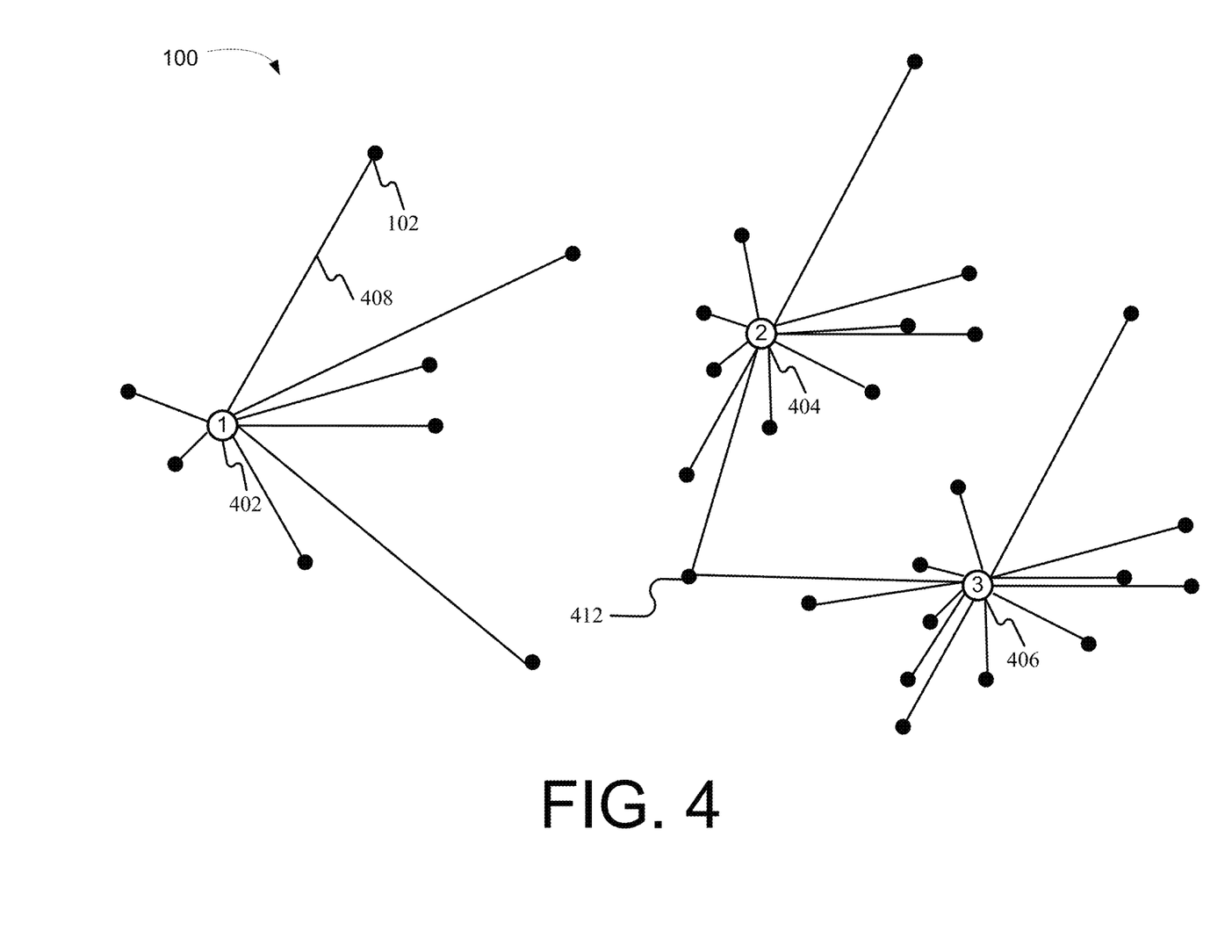
FIG. 4 is a diagram of video title items grouped into clusters by video title characteristics associated with the video title items, according to example embodiments of the disclosure.

FIG. 1 is a block diagram depicting generation of individual user profiles from a global dataset of video title streaming information, according to example embodiments of the disclosure. FIGS. 1, 2, and 4 depict steps in grouping video title items using a neural network that applies one or more machine learning techniques. The global dataset of video title streaming information 104 is shown in FIG. 1 as an input for data segmenting and cluster mapping operations 106. The encoder and decoder of a deep embedded clustering engine (e.g., the data segmentation engine 606, and the cluster mapping engine 608, described hereafter with respect to FIG. 6) read in the global dataset 104, and output a clustered dataset of video title streaming information 108. The clustered dataset of video title streaming information 108 can be applied to account title streaming information for a single account (e.g., a shared family account with a digital video content provider). The clustered dataset of video title streaming information 108 may inform the profile building engine (e.g., a profile building engine 610, as described hereafter with respect to FIG. 6) of observed associations between clusters of video title items 100. The observed associations can provide a predictive framework with which user profile information 114 is generated by the profile building process 112.

The global dataset of video title streaming information 104 shows the video title items 100. The video title items 100 may exist as data from large numbers of video content streaming and downloads over a predetermined period of time (for example months, years, etc.), and within a geographic region (e.g., a city, North America, North and South America, India, etc.). For example, the video title items 100 may be all video content streamed or downloaded in North America during the month of June. In another example, the video title items 100 may represent the video content streamed or downloaded in a city over the course of a week. In yet another aspect, the video title items 100 may be the video content streamed or downloaded by a single family, using a single video content account, over the course of a calendar year. It should be appreciated that the video title items depicted in FIGS. 1, 2, and 4 are for explanation purposes only, and are not intended to be limiting to a particular data set, geographic region, or period of time.

As explained in greater detail hereafter, a video title item (e.g., the video title item 102) can include information associated with video content that can include the video content itself, and metadata associated with that video content that describes the video content in a meaningful way. As shown in FIGS. 1, 2, and 4, the plurality of video title items 100 are described as a large data set of video content downloads (or video content that was streamed to user devices) over a period of time. For example, the video title items 100 may represent all video content downloaded or streamed over the course of a calendar year in North America. It should be appreciated that a human observer of the download data cannot identify the associations between discrete video content downloads and various attributes (e.g., video title characteristics) of the various video content. For example, it may not be clear to an observer of raw download data that describes video content items downloaded over a period of time, that users that download toy unboxing videos may also be fond of cooking programming that features cupcake decorating. An observation of this sort may be determined only by organizing the video title items in a meaningful way. Accordingly, using conventional systems, an opportunity to enhance the user experience by providing customized recommendations to individual viewers may be lost, because individual viewing habits may not be visible in data showing shared viewing habits, without meaningful analysis and organization.

The plurality of video title items 100, as shown in FIG. 1, can include any number of items, which before clustering, may or may not be organized in a useful or cohesive way. For example, the depiction of the video title items in FIG. 1 appears to be random in distribution with respect to position on the page. Using clustering techniques, the random distribution may be organized into useful clusters that share characteristics.

Cluster analysis, or clustering, is a machine learning process of grouping a set of objects in such a way that objects in the same group (called a cluster) are more similar (in some sense) to each other than to those in other groups (clusters). Cluster analysis is a main task of exploratory data mining, and a common technique for statistical data analysis, used in many fields, including machine learning, pattern recognition, image analysis, information retrieval, bioinformatics, data compression, and computer graphics.

One method of cluster analysis, called associative deep clustering, provides a learning scheme for finding a rule to assign each example of a data set to one of k clusters. Deep embedding is sometimes applied to deep-learning-based clustering for image datasets. As applied herein, deep embedding may provide data analysis and visualization for determining a notion of distance or dissimilarity that is common to data clustering algorithms. The distance or dissimilarity represented in FIGS. 1, 2, and 4 can represent how alike or different the video content is, which may be dynamic according to the characteristics learned and used in the analysis. As shown in FIG. 1, the distance between the ungrouped video title items 100 is shown to be generally random to represent an untrained dataset of video title items, including a video title item 102. Distance between the video title items 100, in turn, relies on representing the data in a feature space. A clustering algorithm commonly referred to as the k-means clustering algorithm, uses the Euclidean distance between points in a given feature space, which (when applied to images datasets) might be raw pixels or gradient. As described with respect to one or more embodiments, and as applied to video title items 100, the Euclidean distance may be video title characteristics shared between points, with distances between the video title items representing a magnitude of similarity between clusters of items. In other methods, associations can be made between cluster centroids and data embeddings without subsequent clustering steps such as k-means. Although deep embedded clustering methods may be varied, and a full discussion of deep embedded clustering is outside the scope of the present disclosure, it should be appreciated that the clustering generally includes two phases: 1) parameter initialization with a deep autoencoder, and 2) parameter optimization (i.e., clustering), where the system iterates between computing an auxiliary target distribution and minimizing the Kullback-Leibler (KL) divergence to the auxiliary target distribution. The result is a centroid k that defines the set of elements (described here in the context of the video title items 100) as a cluster center in the feature space. Stated more succinctly, FIG. 1 depicts metadata associated with streams/downloads of video content, over a period of time, by customers of a video content provider. FIG. 1 demonstrates the seemingly random nature of an untrained dataset of download data, which may not be useful without aspects described herein.

According to an embodiment, a first step in developing a user profile from a large untrained dataset is to form associations from a large dataset that learn characteristics of the video content, and form video title characteristics that associate groups of video content together. The learned video title characteristics are usable to group the video title items into clusters, which can then be applied to a smaller dataset (e.g., a history of video title items streamed/downloaded over the course of a year or some other timespan, in a single account). With the understanding provided by the larger dataset, the single account history may be segmented into characteristics that can identify discrete users from a single body of viewing history, and perhaps more importantly, identify individual user preferences for video content.

In the field of deep embedded clustering, centroids represent a central point of a cluster of related items. FIG. 2 is a depiction of three centroids 202, 204, and 206, in the ungrouped video title items of FIG. 1, according to example embodiments of the disclosure. The centroid 202 may represent an output of the parameter initialization of a data set of video title items. The parameter optimization step may result in a plurality of video title items 200 that are segmented into three clusters, represented by the centroid 202, the centroid 204, and the centroid 206. The grouping of the video title items 200 may be based on one or more video title characteristics. A system processor may apply one or more known techniques for unsupervised deep embedding to generate centroid information (e.g., the centroids 202, 204, and 206). Before further describing the initial process of grouping the video title items into clusters, video title items (such as the video title item 102) are described in greater detail.

Figure 3:
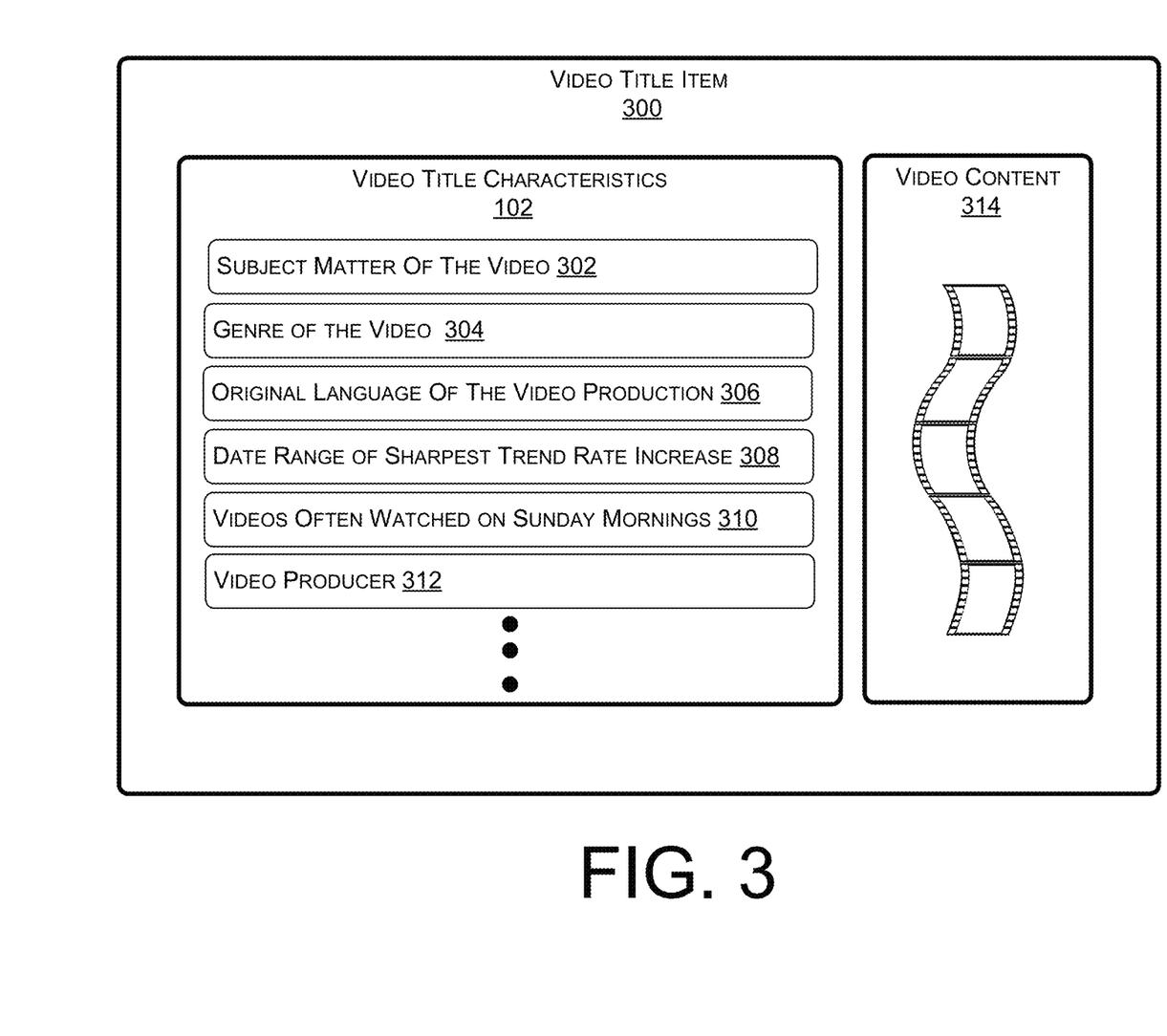
FIG. 3 is a block diagram of a video title item having one or more video title characteristics and video content, according to example embodiments of the disclosure.

FIG. 3 is a block diagram of a video title item 300, according to example embodiments of the disclosure. The video title item 300 can include a plurality of video title characteristics 102, and may be associated with video content 314. The video title item 300 may be a data structure that associates the one or more video title characteristics 102, and video content 314 in a meaningful way that can form associations between users and streamed and/or downloaded video content. For example, the video title item 300 can associate the video content 314 with any one or more of the plurality of video title characteristics 102. The plurality of video title characteristics 102 may be used, at least in part, to associate video title characteristics with individual users.

The video content 314 may be, for example, a video offered for streaming by a streaming service. The term video, as used herein, may refer to movies, television programs, and any other type of video including user-generated/produced video content and/or the like. Video may refer to digital video, such as download/streamed videos or so-called on-demand videos, or may refer to physical video media, such as a digital video disc (DVD) or the like. While the present technology may be described primarily in the context of streaming and/or downloaded online video content, the technology may also be applied in a variety of other digital work or content item (digital or non-digital) contexts. A digital work may refer to a video, image, audio file, text (such as e-books, electronic documents, and the like), electronic games, software, etc. or any combination thereof. A content item may include items similar to digital works, but may further encompass digital and/or physical embodiments of the items. Various examples of the systems, methods and other aspects of the technology are thus described in the context of consumable content generally, and video specifically, without specific limitation to such video implementations, or to consumable content implementations. For example, determining a user behavior and creating the user profile based on a trained neural network using a large dataset of user behavior may be applicable to other data formats such as audio, visual images, products, etc.

In some aspects, the video content 314 may be television programming, movies, home movies, or other user-submitted content such as how-to videos, and any other content that that may be maintained as a collection of items and saved in computer storage. In one embodiment, the video content 314 may be the video content files that comprise the video. In another aspect, the video content 314 may be a link, pointer, URL address, or other instructions to access the video content, which may be stored in a connected network-accessible computer storage. In some aspects, the video content 314 may be controlled by the provider of video content accounts. In other aspects, the video content may be controlled by another entity, and accessible by the video content provider.

The video title characteristics 102 may be information associated with the video title 314, and may be indicative of various attributes that may describe the video content 314. For example, video title characteristics 102 can include a subject matter of the video content (shown as the subject matter of video 302), a genre of a video 304 (e.g., action, romantic comedy, western, etc.), an original language of production of the video 306 (e.g., English, French, Mandarin, etc.), streaming trend information such as, for example, a date range of the sharpest trend rate increase for downloading the video content 308, (e.g., videos that had fastest trend rates among all videos between December 2018 and February 2019, etc.), information of videos often watched on a particular day 310, (e.g., the set of football movies are often watched on Sunday morning, whereas the set of cooking-related videos are often watched on Tuesday afternoons, etc.), video producers 312, (e.g., movies produced by Frederick H. Jones) associated with the video content 314, etc.

In some aspects, the video title items 100 may be dynamically changed according to discovered and/or determined attributes and characteristics of the video content 314. For example, known characteristics associated with the video content 314 may be the subject matter of the video 302 and the genre of the video 304. Through machine learning techniques, it may be learned that the video content 314 is associated with additional characteristics, such as the video title characteristics 306-312. For example, using a deep embedded clustering method, and with data augmentation methods, the processor 602 may take in the global dataset of video title streaming information 104, and segment the data by performing a transformation to a predetermined number of clusters according to groups of video title characteristics. Grouping by video title characteristics may include, for example, taking in a plurality of metadata tags descriptive of the video content (e.g., "comedy", "producer=A.G. Jackson", "trend maximum rate=Jan. 4, 2019", etc.). In other aspects, the processor 502 may assign video title characteristics using other machine learning techniques for contextual analysis (e.g., action adventure movie with masked robbers running into a building is likely associated with gunfire, car chasing, and bank robbery simulation).

The processor 602 may initialize the cluster centers with the video title characteristics. Although the video title characteristics 102 include characteristics 302-312, it should be appreciated that any type and number of characteristics associated with the video content is contemplated. Initializing the cluster centers may include reading in the global dataset 104 into the encoder of the processor 602, and extracting an embedded feature from each of the video title items 100 (e.g., using a single example, extracting an embedded feature from the video title characteristic 102 by evaluating one or more of the subject matter of the video, genre of the video, original language of the video production, etc.). The extracted embedded feature may be fed to a decoder in the processor 602 to generate a reconstructed dataset that is iteratively fed back to the encoder. The clustered dataset of video title streaming information 108 now include the plurality of video title items 100 clustered into discrete groups.

Figure 6:
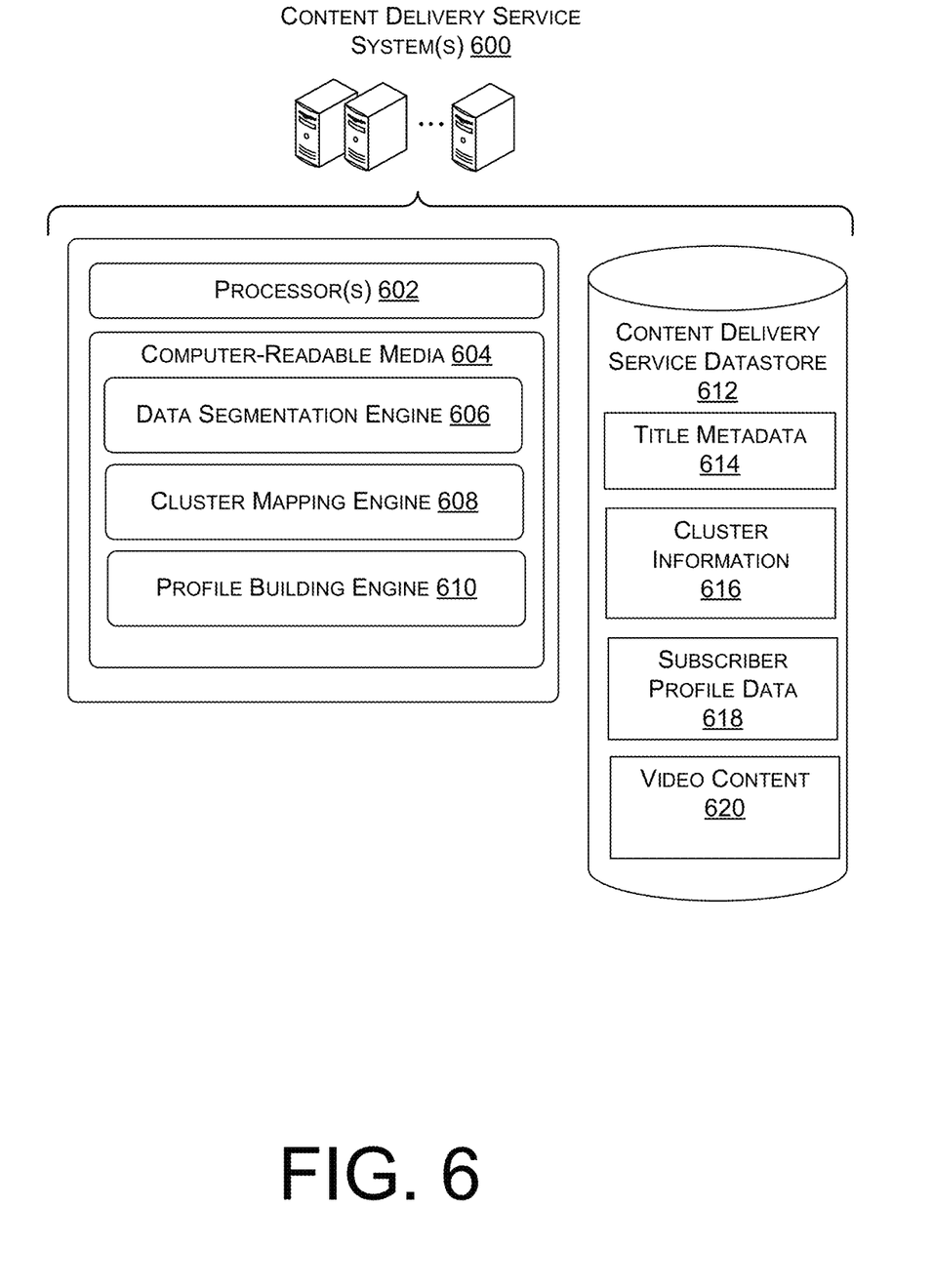
FIG. 6 is a schematic diagram of the illustrative computing architecture of a content delivery service system, according to example embodiments of the disclosure.

Returning again to FIG. 2, the plurality of video title items 100 is depicted, where the video title items 100 have been evaluated by a processor of the system (e.g., a content delivery service system such as described with respect to FIG. 6), and the centroids 202, 204, and 206 are determined as cluster centers. The cluster centroids 202, 204, and 206 are identified by evaluating the video title characteristics associated with the video title items, and applying one or more popular methods for clustering such as k-means, or via a Gaussian Mixture Model (GMM). The video title characteristics may be known and associated with the video title items 100. The video title characteristics may be used, therefore, to associate Gaussian distributions of k-means for generation of the centroids. Accordingly, the centroids 202, 204, and 206 may represent the centers of three distinct groups that can define video title characteristics and identify connecting characteristics that associate one cluster of video title items with another cluster of video title items.

FIG. 4 is a diagram of the video title items 100 grouped into clusters (centroids) 202, 204, and 206 based on video title characteristics associated with the video title items, according to example embodiments of the disclosure. The video title items are grouped into a first cluster of video title items 402, a second cluster of video title items 404, and a third cluster of video title items 406. Each line connecting the respective video title items may represent a degree of association with each respective cluster. For example, the video title item 102 is shown connected with the centroid (pictured as an encircled number 1) by an association 408. The length of the association 408 may depict a degree of association or similarity to the central definition (the centroid) that binds each cluster. For example, a longer association 408 may represent a weaker association, where the centroid may have 4 specific video title characteristics that define it, and the video title item 102 may share only 2 of the 4 video title characteristics. In some embodiments, the degree of association with respect to a video title item 102 and a centroid may be depicted in a manner other than length of a line, such as by depicting the associations in different colors (e.g., a red line indicates a stronger association than a blue line), different patterns (e.g., a solid line indicates a stronger association as compared to a dashed line), different brightness (e.g., a darker line indicates a stronger association than a lighter line), and so on.

As shown in FIG. 4, the system may group the video title items 100 into clusters that may or may not have relationships with one another. In some aspects, the system may identify a connecting characteristic, such as the connecting characteristic 412, that may identify characteristics shared by both clusters 404 and 406. In some aspects, the system may identify connecting characteristics that associate the clusters of video title items, and use the connecting characteristics to identify recommendations for individual users based on observed behavior of similarly-situated users in large data sets (e.g., the data set depicted in FIGS. 1, 2, and 4).

Figure 5:
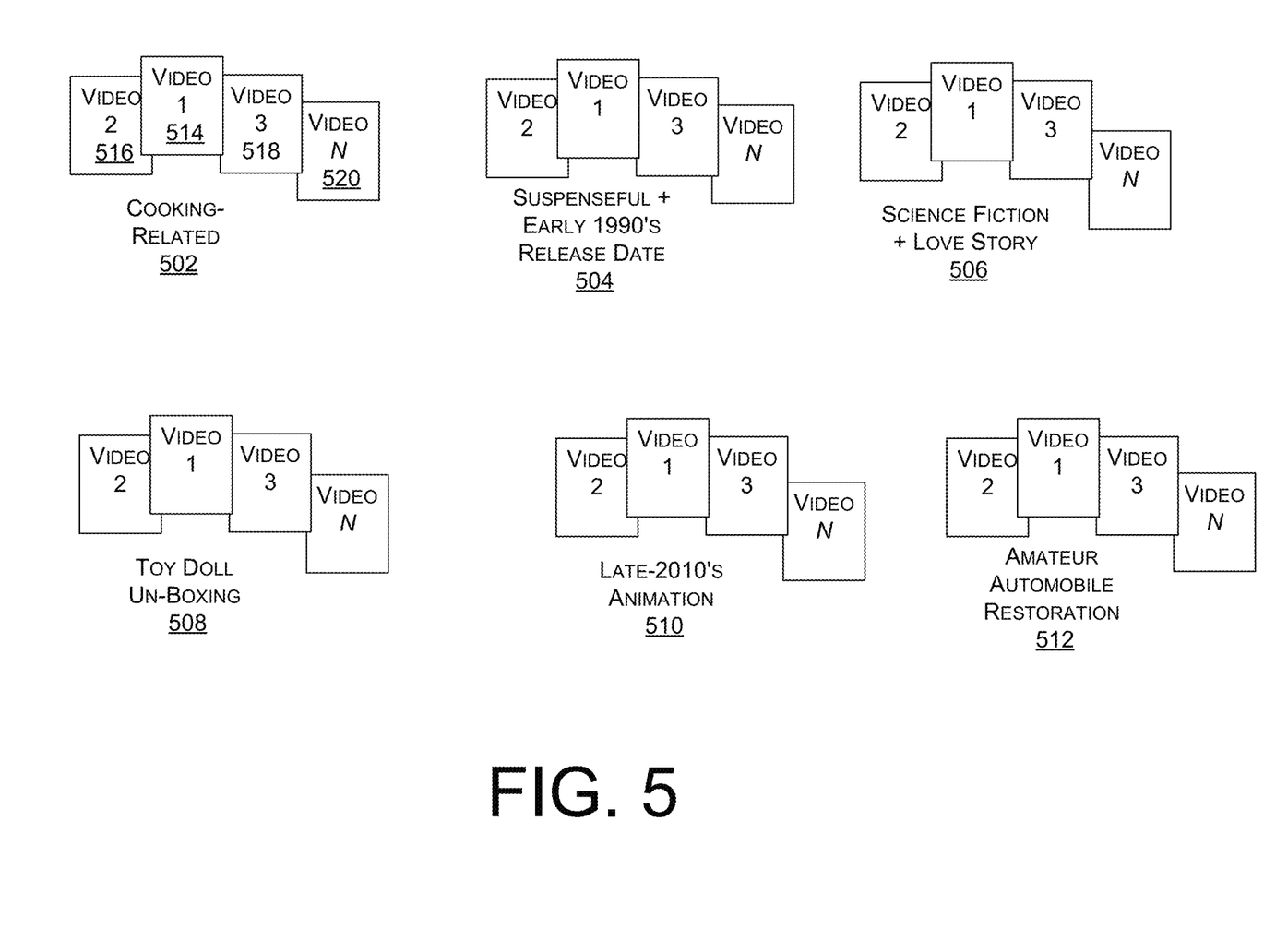
FIG. 5 is a block diagram of video title items grouped by video title characteristic, according to example embodiments of the disclosure.

FIG. 5 is a block diagram of video title items grouped by video title characteristic, according to example embodiments of the disclosure. Six example groups of video content items are shown, including a first group 502, a second group 504, a third group 506, a fourth group 508, a fifth group 510, and a sixth group 512. The groups 502-512 depicted in FIG. 5 are example groups of video content items that have been grouped according to one or more video title characteristics associated with the video content items. For example, the first group 502 includes a number of video content items such as, for example video 1 (516), video 2 (514), video 3 (518) and video N (520).

Although four videos 514-520 are depicted, it should be appreciated that a cluster can include any number of video content items based on how the video title characteristic is associated with the group. For example, the second group 504 may include a plurality of videos having video title characteristics such as suspenseful and early 1990's releases. As another example, the third group 506 may include videos having the video title characteristics in common that include science fiction subject matter and include a love story in the video. Other aspects can also bind video content items together, such as the toy doll un-boxing video title characteristic as shown in the fourth group 508.

Video content items may be associated together in a group based on other aspects, such as time information (depicted as late-2010's animation videos in the fifth group 510). Other ways of characterizing video content can include download/stream rate with respect to time, original release dates, dates of streaming/download by particular segments of users, time information, etc. User-submitted content may also be included characterized by the system. For example, the sixth group 512 includes video content items associated with the video title characteristic amateur automobile restoration. Other video title characteristics are possible.

FIG. 6 is a block diagram of an illustrative computing architecture of the content delivery service system 600, according to example embodiments of the disclosure. The computing architecture may be implemented in a distributed or non-distributed computing environment. The computing architecture of the content delivery service system 600 may include one or more processors 602 and one or more computer readable media 604 that stores various modules, applications, programs, or other data. The computer-readable media 604 may include instructions that, when executed by the one or more processors 602, cause the processors to perform the operations described herein for the analytics service system(s) 120.

In some implementations, the processors(s) 602 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems. The one or more processor(s) 602 may include one or more cores.

Embodiments may be provided as a computer program product including a non-transitory machine-readable storage medium having stored thereon instructions (in compressed or uncompressed form) that may be used to program a computer (or other electronic device) to perform processes or methods described herein. The computer-readable media 604 may include volatile and/or nonvolatile memory, removable and non-removable media implemented in any method or technology for storage of information, such as computer-readable instructions, data structures, program modules, or other data. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 604 may store a data segmentation engine 606, a cluster mapping engine 608, and a profile building engine 610. The computing architecture may include and/or have access to a content delivery service memory 612.

The data segmentation engine 606 may include instructions stored therein that enables the processor(s) 602 to perform the various functions and steps for generating user profiles using a history of streamed video title items associated with the video content account. In some example embodiments, the processor(s) 602 may cause the data segmentation engine 606 to perform various initialization steps in the deep embedded clustering. For example, the data segmentation engine 606 may initialize deep embedded clustering with a stacked autoencoder (SAE), which may produce semantically meaningful and separated datasets of the video title items 100. To initialize the deep embedded clustering, the processor 602 may pass the video title item data through the SAE to obtain embedded data points, then perform standard k-means clustering in the feature space Z to obtain k initial centroids (e.g., the centroids 202, 204, and 206, as shown in FIG. 2).

Deep embedded clustering algorithms consist of two stages: pretraining and finetuning. The pretraining learns valid features which are utilized to initialize the cluster centers (e.g., the centroids). In the finetuning stage, clustering and feature learning are jointly performed. In this way, the learned feature will be task specific, i.e., suitable for clustering tasks that identify video title characteristics, and associate the video title characteristics with particular centroids. The cluster mapping engine 608 may include instructions stored therein for working in conjunction with the data segmentation engine 606 for initialization of the datasets for the deep embedded clustering or other methods used for clustering the video title items. For example, the cluster mapping engine 608 may identify connecting characteristics of the video title characteristics that associate clusters of video title items with one another. The processor 602 may identify connecting video title characteristics by data augmentation methods, such as random rotation, shifting, and cropping, and/or other methods used in supervised neural networks to improve generalization of datasets. For example, the processor 602 may introduce data augmentation into an unsupervised learning model, obtain a set of training samples X, where the training samples are configured to define dimension and a number of samples, and apply a random transformation to obtain the augmented version. One example method is described in the publication titled "Deep Embedded Clustering with Data Augmentation by Xifeng Guo et al." (Proceedings of Machine Learning Research 95:550-565, 2018) which is incorporated herein by reference.

The cluster mapping engine 608 may also evaluate the video title items 100 to determine new ways for correlating the video content items according to user behavior in the large data model. For example, it may be observed that users may stream or download cupcake baking videos directly after sports programming streams on Sundays, but not on Saturdays. This observation, coupled with another observation, may provide a data characterization indicative of an affinity for Saturday afternoon streaming and/or downloads of fishing videos for Sunday sports programming users, and an affinity for cupcake baking content only on Sunday afternoons for users that are different from the Sunday sports programming users. Other functions are contemplated.

The profile building engine 610 may apply information learned from the data segmentation engine 606 and the cluster mapping engine 608 to the task of building profiles for different users of a single streaming account. For example, the profile building engine 610 may identify video title characteristics associated with two or more video content items streamed and/or downloaded by the video content account. The profile building engine 610 may group the two or more video content items streamed by the video content account based at least in part on clusters of video title items observed by the large data set that included streaming data from multiple accounts over time. Accordingly, the profile building engine 610 may associate video title characteristics to user profiles. The profile building engine 610 may also evaluate viewer connections with particular video title characteristics using numeric (weighted) variables in the form of an affinity score. For example, an affinity score may be indicative of a user preference for particular video content. The profile building engine 610 may also provide user profiles that have been generated to a profile management interface based at least in part on a weighted first affinity score (described in greater detail with respect to FIG. 9).

The processor 602 may generate the affinity score by determining connections between user actions and video content accessed by the user (or accessed by a predicted single user, where the single user may not be confirmed). For example, the processor 602 may determine that a particular user is associated with video content relating to automobile repair. Because the processor 602 can observe various actions such as multiple streams of the same video, or streaming multiple different video content having the same theme or subject matter, the processor 602 may estimate affinity according to a count of each instance of user action. For example, if a user accesses three videos associated with the same subject matter, an affinity score of three may be associated with that subject matter. However, if the user accesses videos associated with the same subject matter 15 times, a value of 15 may be attributed to the affinity score. In other aspects, instances of user action may be linearly associated with the weight of the affinity score. Other methods of weighting the affinity score are contemplated.

The content delivery service datastore 612 can include several separate data tables, databases or other data storage mechanisms and media for storing data relating to a particular aspect. For example, the data store illustrated includes mechanisms for storing title metadata 614 (e.g., string data indicative of a title for the video content), cluster information 616 (e.g., information assigned to one or more centroids to identify the centroid), subscriber profile data 618 (e.g., one or more indicators of unique account information, subscriber identity information that identifies a subscriber, financial account data for indicating a payment account, etc.), and video content 620 (e.g., the video for streaming).

Figure 7:
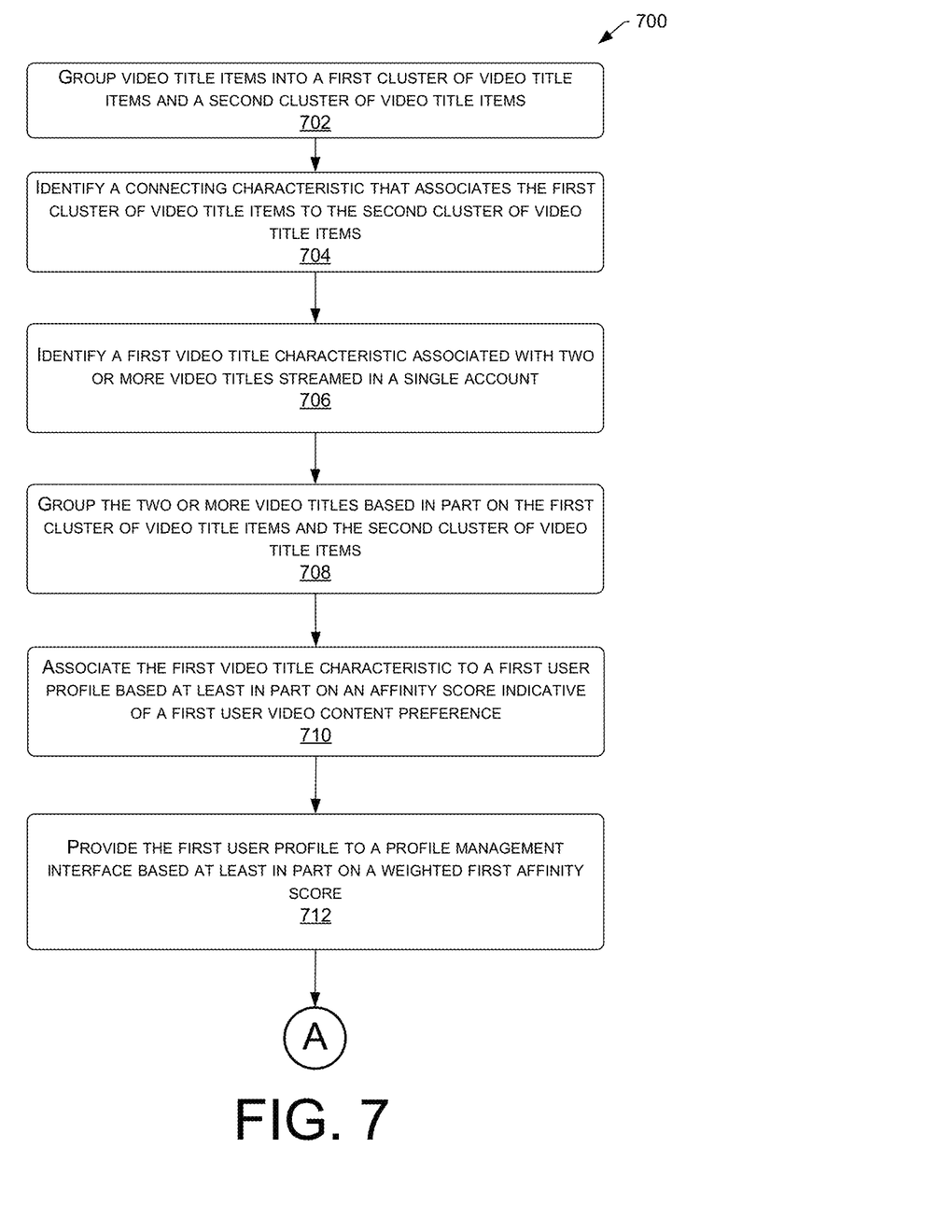
FIG. 7 is a flow diagram of an illustrative method to generate a first user profile based on a history of streamed video title items, according to example embodiments of the disclosure.
Figure 8:
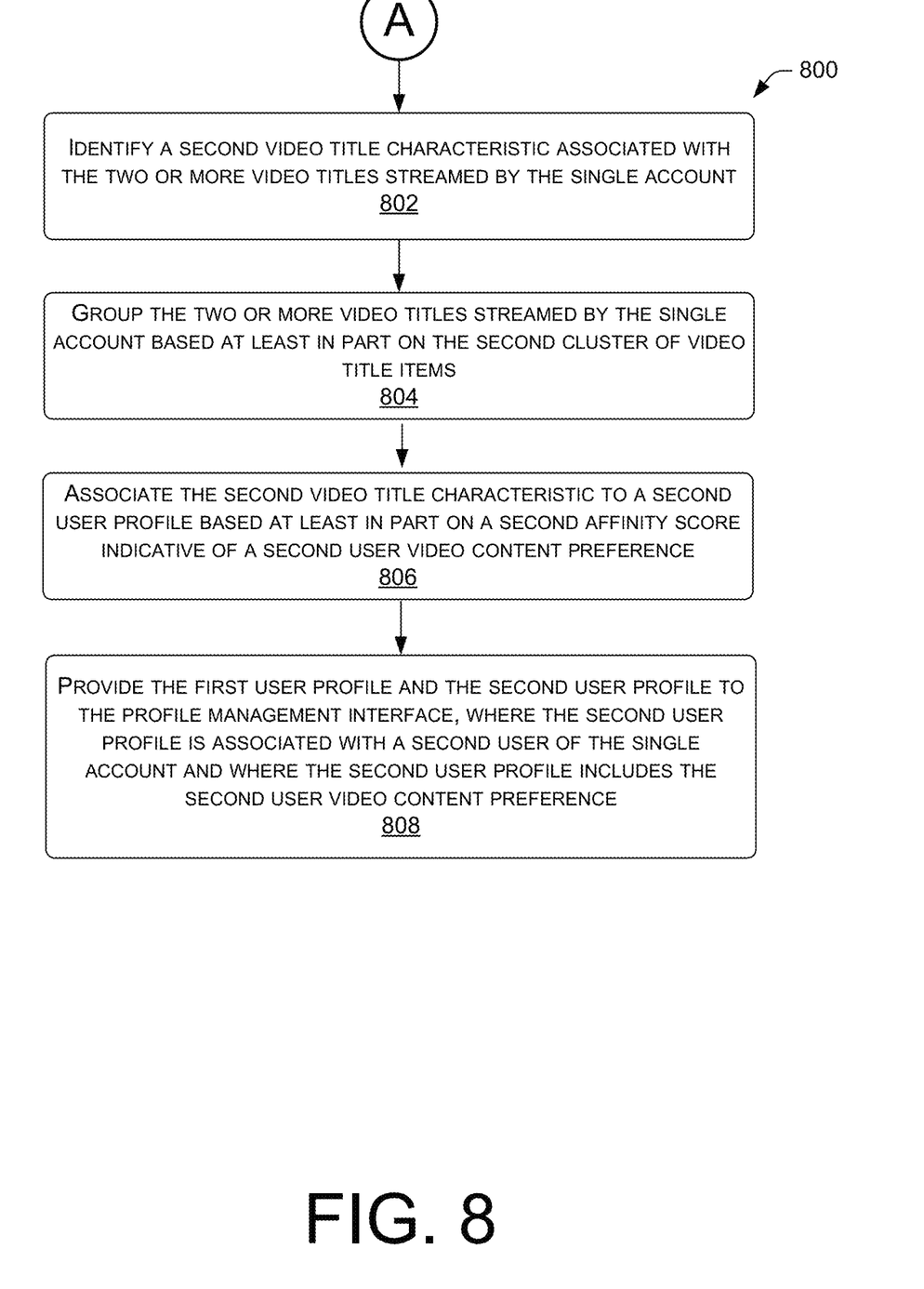
FIG. 8 is a flow diagram of an illustrative method to generate a second user profile using the history of streamed video title items, according to example embodiments of the disclosure.

FIGS. 7 and 8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

More particularly, FIG. 7 is a flow diagram of an illustrative method to generate a first user profile based on a history of streamed video title items, according to example embodiments of the disclosure. In one or more embodiments, the content delivery service system 600 may maintain a collection of video title items in computer storage (e.g., the content delivery service datastore 612). The video title items may be associated with video content 620 saved in the computer storage. In other aspects, maintaining the collection of video title items may be maintaining information about and links to video content that is maintained by another entity. In one aspect, the video content may be accessible by the processor 602 via the Internet or other network connection. The video title items may be associated with video content consumed by a plurality of video content accounts.

At step 702, the processor 602 may group video title items 100 into a first cluster of video title items 402 and a second cluster of video title items 404 based on one or more video title characteristics (e.g., the example video title characteristics 102 as shown in FIG. 3). In some aspects, the video title characteristics can include one or more of a subject, a genre associated with a video content file, date information, and subject matter associated with the video content file.

At step 704, the processor 602 may identify a connecting characteristic of the one or more video title characteristics that associates the first cluster of video title items 402 and the second cluster of video title items 404.

At step 706, the processor 602 may create, using the first cluster and the second cluster, a first user profile associated with a video content account based at least in part on a history of streamed video title items. Accordingly, at step 706, the processor 602 may identify a first video title characteristic associated with two or more video content items streamed by the video content account.

At step 708, the processor 602 may group the two or more video content items streamed by the video content account based at least in part on the first cluster of video title items and the second cluster of video title items.

At step 710, the processor 602 may associate the first video title characteristic to the first user profile based at least in part on an affinity score indicative of a first user video content preference. In some aspects, the affinity score is weighted according to a history of streamed video title items associated with the video content account. More particularly, the processor 602 may weight the affinity score with a weight coefficient indicative of the first user video content preference. The content preference coefficient may be related to a predicted interest of a particular video content to a user. In one example, weighting the affinity score may include identifying at least one video title item having the first video title characteristic from a history of streamed video title items associated with the video content account. The processor 602 may determine at least one instance of user action indicative of an affinity level of the affinity score. A user account may include data indicative of various user actions associated with streaming video content. For example, the user actions could show that there have been multiple streams and/or downloads of at least one video title item within a predetermined span of time.

By downloading a particular video often (at a rate that is greater than other users with respect to that video or at a rate that is greater with respect to different videos), the user may provide the processor 602 an indication that they have an affinity for the particular content. In one aspect, the more numerous the downloads, the greater the predicted interest. In another aspect, user actions could include streaming a plurality of video content files having one or more video characteristics in common with the at least one video title item. For example, streaming and/or downloading ten videos associated with medieval warfare and medieval weapons may indicate a user affinity for video characteristics of historical drama, war history, weapon engineering, etc.

According to embodiments, the processor 602 may increase the affinity score for each instance of user action, and possibly maintain or decrease the affinity score due to lack of user action (e.g., little to no downloads or streams of video content). The affinity score may also be weighted based on the connecting characteristic of the one or more video title characteristics that associates one cluster of video title items with another cluster of video title items. For example, the processor 602 may determine that a first cluster associated with medieval warfare dramas holds a strong correlation to building engineering videos, which may be associated with another cluster. Although unrelated to a human observer, by analyzing hidden connections between clusters in large datasets, as may be done using the machine learning techniques described herein, a relatively large affinity score associated with medieval warfare drama may trigger a stronger weight associated with building engineering video content, whereas given the same set of circumstances in the data (but without the medieval warfare drama video title characteristic), the affinity score associated with the building engineering video content would be significantly smaller.

At step 712 the processor 602 may provide the first user profile to a profile management interface based at least in part on a weighted first affinity score. The affinity score may be weighted based on the connecting characteristic of the one or more video title characteristics that associates the first cluster of video title items with the second cluster of video title items. In some aspects, the processor 602 may provide the first user profile to a profile management interface of a user device based at least in part on the weighted first affinity score, wherein the first user profile is associated with a first user of the video content account and includes the first user video content preference. In some aspects, providing the user profile can include recommending a video title characteristic for the first user profile based on the connecting characteristic.

In example embodiments, the method can further include creating, using the second cluster, a second user profile associated with the video content account based at least in part on the history of streamed video title items. For example, if two family members are streaming different types of video content using the same account, it may be advantageous to evaluate the stream history and provide a user profile for each of the users. FIG. 8 is a flow diagram of an illustrative method to generate a second user profile using the history of streamed video title items, according to example embodiments of the disclosure.

With reference to FIG. 8, at step 802, the processor 602 may identify a second video title characteristic associated with the two or more video content items streamed by the video content account. At step 804, the processor 602 may group the two or more video content items streamed by the video content account based at least in part on the second cluster of video title items.

At step 806, the processor 602 may associate the second video title characteristic to the second user profile based at least in part on a second affinity score indicative of a second user video content preference. In some aspects, the second affinity score may be weighted according to the history of streamed video title items associated with the video content account.

At step 808, the processor 602 may provide the first user profile and the second user profile to the profile management interface. The second user profile may be associated with a second user of the video content account, and can include the second user video content preference. According to an embodiment, the processor 602 may have correctly identified video content items and/or video title characteristics for each of the first user and the second user. In some aspects, however, the processor 602 may have mis-identified characteristics and attributed them to the wrong individual. Accordingly, the processor may present the first user profile and the second user profile vis the profile management interface, and receive user feedback in the form of addition or removal of one or more video title characteristics. For example, if the processor 602 predicts that a first user A is interested in cycling videos and cake decorating videos, the first user A may realize that it is user B that is interested in cake decorating. Accordingly, user A, via the profile management interface, may move the video title characteristic titled "cake decorating" from their profile (e.g., an icon representing user A), and move the video title characteristic to the icon representing the user B user profile. Moving may be a drag-and-drop operation, a delete/add feature, or another mechanism for manipulating online data.

Figure 9:
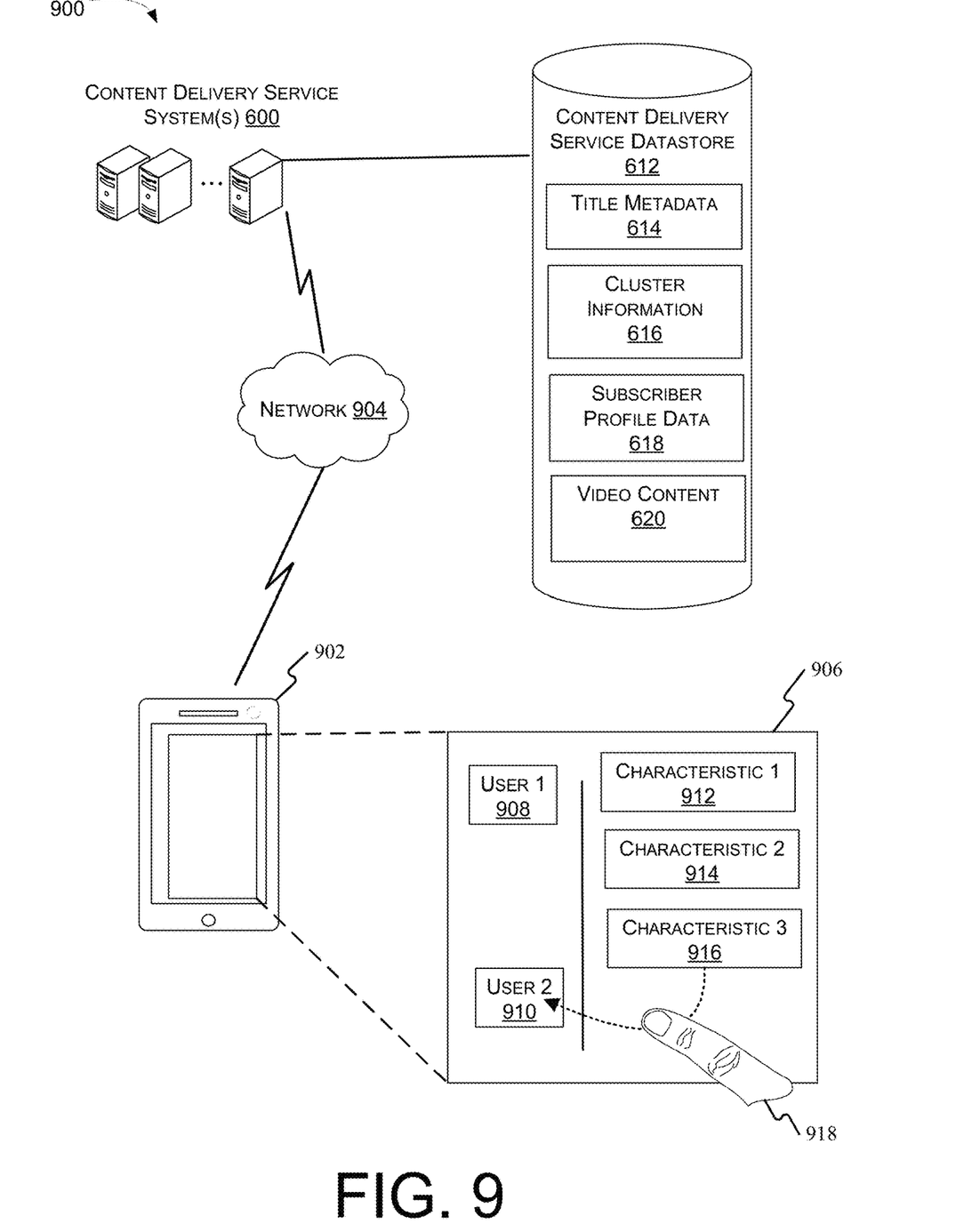
FIG. 9 is a system and network diagram that shows an illustrative operating environment that includes the content delivery system of FIG. 6 that can be configured to implement aspects of the functionality described herein, according to example embodiments of the disclosure.

FIG. 9 is a system and network diagram that shows an illustrative operating environment 900 that includes the content delivery service system 600 of FIG. 6. The operating environment 900 can be configured to implement aspects of the functionality described herein, according to example embodiments of the disclosure.

As will be appreciated, although a Web-based environment is used for purposes of explanation, different environments may be used, as appropriate, to implement various embodiments. A network 904 may be included in the operating environment 900, which can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network 904 can be enabled by wired or wireless connections and combinations thereof. In this example, the network includes the Internet, as the environment includes a Web server (which may be one or more servers in the content delivery service system 600) for receiving requests and serving content in response thereto, although for other networks an alternative device serving a similar purpose could be used as would be apparent to one of ordinary skill in the art.

It should be understood that there can be several application servers, layers, or other elements, processes or components, which may be chained or otherwise configured, which can interact to perform tasks such as obtaining data from an appropriate data store. The content delivery service system 600 may include the content delivery service datastore 612. As used herein the terms "datastore" and "data store" refer to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the datastore, and is able to generate content such as text, graphics, audio and/or video to be transferred to the user, which may be served to the user by the Web server in the form of HTML, XML or another appropriate structured language in this example. The handling of all requests and responses, as well as the delivery of content between a client device (not shown) and the hosted service systems 102, can be handled by a Web server (not shown).

The users of the content delivery service system 600 can access the computing resources, such as content delivery service system 600, over the network 904, which can be a wide area communication network ("WAN"), such as the Internet, an intranet or an Internet service provider ("ISP") network or a combination of such networks. For example, and without limitation, a client computing device 902 operated by a user can be utilized to access the system 600 by way of the network 904. It should be appreciated that a local-area network ("LAN"), the Internet, or any other networking topology known in the art that connects the data centers to remote users and other users can be utilized. It should also be appreciated that combinations of such networks can also be utilized.

The client computing device 902 may be any content delivery apparatus suitable for accessing video or other electronic content via a connected network. For example, the client computing device 902 may be a laptop computer, a hand-held device such as a smartphone, a tablet computer, a desktop computer, a gaming console, a smart television, etc. In some aspects, a user 918 may operate the client computing device 902 through a profile management interface 906. According to embodiments described herein, the processor 602 may provide the first user profile 908 and the second user profile 910 to the profile management interface 906. The user 918 may see the video title characteristics associated with the video content streamed through their account. Accordingly, the plurality of characteristics can include (as depicted in FIG. 9), a first characteristic 912, a second characteristic 914, and a third characteristic 916. The characteristics 912, 914, and 916 may be associated with user 1 or user 2, however the processor 602 may have incomplete data to make a final determination. In other aspects, the processor 602 may have incorrectly associated a characteristic with the wrong user. Accordingly, the user 918, using the profile management interface 906, may drag and drop characteristics to an icon associated with their information. In other aspects, the user 918 may remove characteristics, and perform other edits to their account profile.

Aspects of the present disclosure may provide technical solutions for the technical problem rooted in internet-based delivery of digital video content. For example, when providing digital content on a national, multi-national, or global scale, it should be appreciated that analyzing data associated with thousands or tens of thousands of video streams, and for each video stream, data associated with content that was streamed, is not practical for human analysis without computer-implemented methods described herein. For example, the technical problem of analyzing global datasets of video title streaming information to discover hidden connections between certain videos and affinity for seemingly unrelated content is not possible by human thought/analysis alone. Moreover, applying datasets associated with global downloads/streams may be advantageous for solving the technical problem of automated discovery of personal viewing tastes of unknown individuals when they are collectively using a single video content account.

In other aspects of the present disclosure, computational accuracy is improved in the physical machine performing the computer computation by narrowing the amount of information evaluated (e.g., by using the centroids and/or connections associated with the centroids) when analyzing the single account information to create the user profiles. Accordingly, the present disclosure provides a reduced network bandwidth used to deliver the content and, additional storage capacity due to reductions of unneeded data, and a reduction in latency when evaluating the video content account for identification of individual users and/or user profiles.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method comprising:
   accessing a global dataset of video title downloads, the global dataset comprising data relating to downloads of video title items from a content delivery system to a plurality of download accounts over a period of time and relating to video title characteristics for the video title items;

executing a machine learning algorithm on the global dataset to determine associations among the video title characteristics from the downloads;

grouping the video title items into clusters based at least in part on the associations among the video title characteristics;

identifying a connecting characteristic between a plurality of the video title characteristics that associates a first cluster of the video title items and a second cluster of the video title items;

accessing a history of streamed or downloaded video content items associated with a video content account;

identifying a video title characteristic associated with two or more video content items within the history;

forming a group of the two or more video content items based at least in part on the video title characteristic and on one of the first cluster of the video title items or the second cluster of the video title items;

associating the video title characteristic with a user profile based at least in part on the group of the two or more video content items and on an affinity score indicative of a preference of a user of the video content account for the video title characteristic; and providing access to the user profile via a profile management interface.

2. The method of claim 1, wherein the affinity score is weighted according to the history of streamed or downloaded video content items.

3. The method of claim 1, wherein providing access to the user profile further comprises recommending a video title characteristic for the user profile based at least in part on the connecting characteristic, wherein the connecting characteristic is indicative that the user is predisposed to prefer a second video title item in the second cluster of the video title items.

4. The method of claim 1, wherein the video title characteristics comprises one or more of a genre associated with the video content items, date information associated with the video content items, and a subject matter associated with the video content items.

5. The method of claim 1, further comprising weighting the affinity score to generate a weighted affinity score, wherein weighting the affinity score comprises:

determining at least one instance of a user action of a plurality of user actions associated with the video content account, the plurality of user actions comprising:

streaming or downloading multiple instances of the two or more video content items by the video content account within a predetermined span of time; and streaming or downloading other video content items having the video title characteristic; and increasing the affinity score for the at least one instance of the user action.

6. The method of claim 5, further comprising weighting the affinity score based at least in part on the connecting characteristic, wherein the affinity score increases linearly with a count of the at least one instance of the user action.

7. The method of claim 1, further comprising creating, based at least in part on the second cluster of video title items, a second user profile associated with the video content account based at least in part on the history of streamed or downloaded video content items.

8. The method of claim 7, wherein creating the second user profile comprises:

identifying a second video title characteristic associated with the two or more video content items;

grouping the two or more video content items based at least in part on the second cluster of the video title items;

associating the second video title characteristic with the second user profile based at least in part on the grouping the two or more video content items based on the second cluster and on a second affinity score indicative of a preference for the second video title characteristic, wherein the second affinity score is weighted according to the history of streamed or downloaded video content items; and providing the user profile and the second user profile to the profile management interface, wherein the second user profile is associated with a second user of the video content account.

9. The method of claim 1, wherein providing access to the user profile further comprises:

providing access to the one or more video title characteristics associated with the user profile, and indicating an association of the one or more video title characteristics assigned to the user profile to an icon representative of the user; and generating a request for user input to assign the one or more video title characteristics to a second user profile.

10. The method of claim 1, comprising maintaining a collection of video title items in computer storage, wherein the collection of video title items are associated with video content that are saved in the computer storage or that are accessible by a processor, wherein the video title characteristics include at least one of the subject matter of the video content item, or a genre of the video content item.

11. A system comprising:

one or more processors; and memory to store one or more computer-executable instructions that, when executed by the one or more processors, perform operations comprising:

accessing a download dataset, the download dataset comprising data relating to a global download history of video title items downloaded from a content delivery system to a plurality of download accounts over a period of time and relating to video title characteristics for the video title items;

applying the download dataset to a neural network to determine relationships between the video title characteristics from the global download history;

grouping the video title items into at least a first cluster of video title items and a second cluster of video title items based at least in part on the relationships between the video title characteristics;

creating a first user profile indicative of one or more video content preferences of a first user associated with a video content account, based at least in part on an account history of streamed or downloaded video content items associated with the video content account, wherein creating the first user profile comprises:

identifying a video title characteristic associated with video content items streamed or downloaded in association with the video content account; and grouping the video content items based at least in part on the video title characteristic and on one of the first cluster of video title items or the second cluster of video title items;

creating, based at least in part on the second cluster of video title items, a second user profile associated with the video content account based at least in part on the account history of streamed or downloaded video content items; and providing access to the first user profile and the second user profile, wherein the first user profile is associated with the first user of the video content account and indicates a first video content preference, and wherein the second user profile is associated with a second user of the video content account and indicates a second video content preference.

12. The system of claim 11, wherein providing access to the first user profile further comprises recommending a different video title characteristic for the first user profile based at least in part on a connecting characteristic, wherein the connecting characteristic associates the first cluster of video title items and the second cluster of video title items and is indicative that an individual having a preference for a video title item in the first cluster is predisposed to prefer a video title item in the second cluster; and wherein the first user profile and the second user profile are based at least in part on a weighted affinity score.

13. The system of claim 11, wherein the video title characteristics comprise a genre associated with the video content items, date information associated with the at least one video content item, and a subject matter associated with the at least one video content item.

14. The system of claim 11, further comprising weighting an affinity score indicative of the preference of the first user for the at least one video content item, comprising:

determining at least one instance of a user action of a plurality of user actions associated with the video content account, the plurality of user actions comprising:

streaming or downloading multiple instances of one or more of the video content items within a predetermined span of time; and streaming or downloading other video content items having the video title characteristic; and increasing the affinity score for the at least one instance of the user action.

15. The system of claim 11, wherein creating the second user profile comprises:

identifying a second video title characteristic associated with the video content items streamed by the video content account;

grouping the video content items streamed by the video content account based at least in part on the second cluster of video title items;

associating the second video title characteristic to the second user profile based at least in part on a second affinity score indicative of a second user video content preference, wherein the second affinity score is weighted according to the account history; and providing the first user profile and the second user profile to a profile management interface, wherein the second user profile is associated with a second user of the video content account.

16. The system of claim 11, comprising maintaining a collection of video title items in computer storage, wherein the video title items are associated with video content that are saved in the computer storage or that are accessible by a processor, wherein the video title items are associated with video content consumed in association with a plurality of video content accounts.

17. One or more non-transitory computer-readable storage media having instructions stored thereupon which are executable by one or more processors and which, when executed, cause the one or more processors to:

access a global dataset of video title downloads, the global dataset comprising data relating to global downloads of video title items from a content delivery system to a plurality of download accounts over a period of time and relating to video title characteristics for the video title items;

execute a machine learning algorithm on the global dataset to determine relationships between the video title characteristics based at least in part on the global downloads;

group the video title items into at least a first cluster of video title items and a second cluster of video title items based at least in part on the relationships between the video title characteristics;

access a history of streamed or downloaded video content items associated with the video content account;

identify a video title characteristic associated with video content items streamed or downloaded by the video content account;

group the video content items based at least in part on one of the first cluster of video title items or the second cluster of video title items;

associate the video title characteristic with a user profile based at least in part on the grouping the video content items and on an affinity score indicative of a preference of a user of the video content account for the video title characteristic; and provide access to the user profile via a profile management interface.

18. The one or more non-transitory computer-readable media of claim 17, wherein the affinity score is weighted according to the history of streamed or downloaded video content items.

19. The one or more non-transitory computer-readable media of claim of claim 18, wherein providing access to the user profile further comprises recommending a different video title characteristic for the user profile based at least in part on a connecting characteristic, wherein the connecting characteristic associates the first cluster of video title items and the second cluster of video title items is indicative that the user is predisposed to prefer a second video title item in the second cluster of video title items.

20. The one or more non-transitory computer-readable media of claim of claim 18, wherein the one or more video title characteristics comprises one or more of a genre associated with the video content items, date information associated with the video content items, and a subject matter associated with the video content items.

* * * * *